United States Patent

[11] 3,599,694

[72] Inventors William Bezbatchenko, Jr.
323 Orville Ave., Cuyahoga Falls, Ohio 44221;
Kenneth P. Kinas, Lakeview Drive, Greenlake, Wis. 54127
[21] Appl. No. 866,708
[22] Filed Oct. 15, 1969
[45] Patented Aug. 17, 1971

[54] LIQUID COOLED PNEUMATIC TIRE
21 Claims, 2 Drawing Figs.

[52] U.S. Cl. .................................................. 152/153
[51] Int. Cl. ................................................. B60c 19/06
[50] Field of Search ......................................... 152/153, 196, 356

[56] References Cited
UNITED STATES PATENTS

| | | | |
|---|---|---|---|
| 1,457,892 | 6/1923 | Blackwelder | 152/153 |
| 1,956,739 | 5/1934 | Gollert | 152/153 |
| 2,521,305 | 9/1950 | Olson | 152/153 |
| 2,538,563 | 1/1951 | Isham | 152/153 |
| 877,260 | 1/1908 | Tiefenbacher | 152/196 |
| 1,218,431 | 3/1917 | McCrimmon | 152/196 |
| 665,146 | 1/1901 | Swain | 152/356 |

*Primary Examiner*—Arthur L. La Point
*Assistant Examiner*—D. W. Keen
*Attorneys*—Frank C. Rote, Jr. and Harry F. Pepper, Jr.

ABSTRACT: A pneumatic tire is provided with an internal cooling means comprising as a preferred embodiment a sheet of capillary material disposed across the inner surface of the tire from bead to bead. The sheet possesses capillarity for a selected liquid in order to transport that liquid from the bead areas to the tread zone where excess heat, which can develop in that zone during use, is absorbed through vaporization of the liquid. The vapor formed will thereafter condense adjacent the beads and release heat to the cooler rim and bead zone. The liquid resulting from the condensation is absorbed by the sheet and once again transported to the tread zone, thereby providing an effective and substantially continuous heat exchange cycle between the overheated tread zone and the cooler rim and bead area.

PATENTED AUG 17 1971

3,599,694

INVENTORS
WILLIAM BEZBATCHENKO, JR.
KENNETH P. KINAS
BY
Harry F. Pepper, Jr.
ATTORNEY

LIQUID COOLED PNEUMATIC TIRE

BACKGROUND OF THE INVENTION

The invention relates to pneumatic tires and particularly to cooling of pneumatic tires.

Excessive heat buildup in pneumatic tires has been a serious problem of constant concern to tire manufacturers. Pneumatic tire casings are principally composed of rubber, either synthetic, natural or combinations thereof. Because synthetic and natural rubbers are essentially poor conductors of heat, any heat which is not uniformly distributed throughout the tire may build up in a certain area of a tire. Therefore, during use, certain parts of the tire, usually the area in and around the tread portion, reach high temperatures which can cause deterioration of the structural components in that area. Blowouts, tread separation, chunkout and carcass and belt ply separations are some of the more common types of failure which can be directly related to an unusually high heat buildup in the tread zone of a tire.

The prior art has demonstrated varying approaches to this problem, all of which attempt to achieve a singular result; the removal of an excessive amount of heat from the most critical area of the tire during use. This most critical area is usually the portion of the tire in and around the tread, hereinafter called the "tread portion" or "tread zone" of the tire. These prior are approaches generally include the use of either a gaseous, liquid, or solid heat conducting, absorbing, or exchange medium.

The main problem associated with gaseous or liquid heat exchange mediums is usually one of the designing proper means to control flow of the medium. Tires or wheels cooled by air or water, for example, are nearly always provided with pumps, pipes, ducts, etc., or alternatively, with agitating or circulating fins, grooves, or flutes, to direct the air or water to an area as close as possible to the tread portion of the tire. Equipment such as pumps, piping and other duct work is expensive, cumbersome, and in most cases not worth the large amount of redesigning efforts necessary. Fins, grooves or flutes, whether incorporated in the tire, on the tire, or around the tire, have up to now, been ineffective in bringing sufficient amounts of the heat exchange fluid into contact with the tread portion of the tire. Flutes, fins and grooves in or on the tire can also adversely affect tire performance to such an extent that many times a totally new tire design concept must be developed before production of a commercially acceptable product is possible.

Because of the aforementioned shortcomings, some tire designers have turned to solid heat conductors in attempts to solve the problem. FOr example, some tires have metallic wires, strips, or plates positioned along the interior or exterior of the tire in heat exchange association with the tread position. Metallic conductors are even placed within the tire structure itself for this purpose. The principal fault found in this type of arrangement is that, for the most part, the solid materials commonly used are poor heat conductors in comparison with gas or liquid. Therefore, these conductors can not absorb and transfer enough heat to properly cool the critical zone. Also, varying thermal stresses tend to wrap or curl most metals, causing tire unbalance and nonuniformity.

In theory, a liquid heat exchange medium should be the most desirable of the aforementioned three mediums. Water, for example, when vaporizing absorbs a large quantity of heat. When water vapor condenses, it releases a similar quantity of heat.

Considering the air chamber of a pneumatic tire while in use, the outer area of the chamber adjacent the tread portion would generally be a hot zone. The area adjacent the spaced beads near the rim is generally a cool zone. Thus, a temperature differential exists between these two zones. If a controlled quantity of liquid were to be brought into the hot zone, and the temperature at the zone were such as to cause the liquid to vaporize, heat will be taken from the immediate surroundings. The vaporization of a liquid will also cause a pressure increase in this zone, thus setting up a pressure differential between the outer tread zone and the inner bead area.

The foregoing conditions are generally those existing in a continuous heat exchange cycle, i.e., a high temperature, high-pressure (evaporator) section spaced from a low temperature, low-pressure (condenser) section.

While this analysis suggests the possibility of using a liquid heat exchange system within the chamber of a pneumatic tire, the problem of a practical means to continuously transport and recycle the working fluid within the chamber has till now not been solved to the satisfaction of the tire engineers.

SUMMARY OF THE INVENTION

An object of the present invention is to provide for heat exchange between the tread portion and rim or bead portion of a pneumatic tire during its operation.

Another object of the present invention is to provide a simply designed and effective means adjacent the inner wall of a tire which transports cooling liquid to a vaporization zone adjacent the tread portion, and continually returns it to that same portion after it has condensed adjacent the rim.

It is a further object of the present invention to provide a capillary means along the chamber wall of a tire capable of transporting and recirculating a selected heat exchanging liquid to the tread portion of a tire by capillary action.

These and other objects are achieved by providing a capillary member within a tire chamber extending between the tread and bead portions of the tire. In a preferred form, a sheet of capillary material is disposed along the inner surface and extends between the bead portions of a pneumatic tire. The capillary material functions somewhat as a wick and is capable of absorbing and holding liquid from its surroundings. When running of the tire produces high temperatures in the tread portion of the tire, water will vaporize from the capillary material in that area and move to a cooler area adjacent the rim, where it condenses and releases heat to the area in and around the rim. The condensate is then absorbed by the portion of the sheet in the bead area and returned by capillary action to the high temperature tread portion. The sheet can cover the entire annular inner surface or a portion thereof. The sheet can be secured to the tire's inner surface of the tire by a suitable adhesive, or may be vulcanized thereto.

PREFERRED EMBODIMENTS OF THE INVENTION

Figure 1:
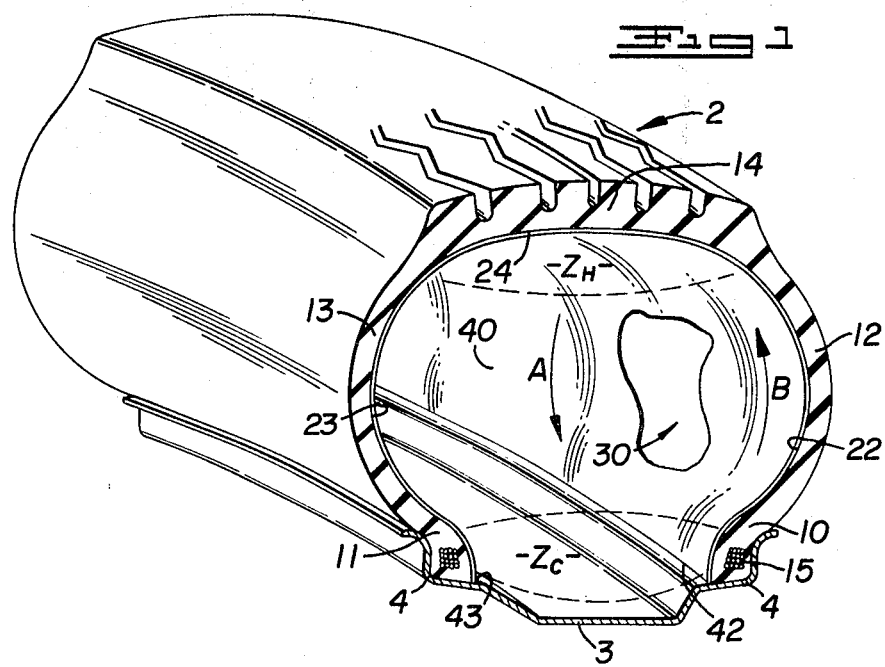
FIG. 1 is a fragmentary perspective view showing a conventional pneumatic tire in which the inner surface is provided with a sheet of fabric according to a preferred embodiment of the invention, with parts omitted, broken away and shown in section.

The following description of a preferred embodiment as illustrated in the drawings will afford a better understanding of the invention. While most of the description is concerned with the aforementioned embodiment, it will nevertheless be clear throughout that various obvious modifications are intended to fall within the scope of the inventive concept.

FIG. 1 shows a section of a typical tubeless pneumatic tire casing 2 composed generally of a pair of spaced, annular bead portions 10 and 11, a pair of space annular sidewall portions 12 and 13 which extend radially outwardly from the bead portions to a circumferentially disposed, annular tread portion 14. The casing 2 is shown combined with a typical rim 3 and is secured thereto by virtue of each bead portion 10 and 11 seating on one of a pair of axially spaced rim flanges 4. Each bead portion incorporates a rigid circular bead 15 holding the tire 2 to the rim 3. Further structural details of the tire 2 are unimportant to the instant invention and are therefore not shown. In other words, the tire 2 is intended to represent a typical tire structure without limitation as to type (i.e. bias, radial, belted, etc.) or utility (i.e. passenger, truck, off the road, bus, etc.).

Also, typically, the radially extending, axially inner surfaces 22 and 23 of the sidewall portions 12 and 13, respectively, join the axially extending, radially inner surface 24 of tread portion 14 to form a continuous, annular chamber wall generally designated 30. The wall 30 and rim 3 define the inner toroidal pneumatic chamber of the tire.

According to a preferred embodiment of the invention, a sheet 40 of capillary material lines the surface of the wall 30. As seen in FIG. 1, the sheet of lining 40 marginally extends between the bead portions 10 and 11, with its marginal edges 42 and 43 disposed along the axially inner corners of the bead portions 10 and 11, respectively. The exact disposition of the marginal edges 42 and 43 is not, however, critical. It is sufficient that the sheet 40 terminate along wall 30 at a location adjacent the radially inner portion near the bead portions 10 and 11. The sheet 40 is shown as it is employed in a tubeless tire. In a tube-type tire, the sheet 40 would be as described above, except it would be preferably disposed along the inner surface of the tube rather than the inner wall of the tire.

Also, in its preferred form, the lining or sheet 40 coextends with the chamber wall 30 in an annular direction, this coextension not being shown in its entirety in FIG. 1 for the sake of brevity. The sheet 40 can, however, annularly extend along only part of the wall 30. Also, several sheets may be spaced annularly along wall 30.

The capillary material can actually take various forms and dispositions within the toroidal inner chamber of the tire. For example, rather than a sheet 40 extending continuously between the bead portion, two sheets of capillary material may be used, one extending from one bead portion such as 10, along surface 22, to a terminal edge along surface 24, the other extending from the other bead portion 11, along surface 23 also to a terminal edge on surface 24 spaced from the terminal edge of the first sheet.

The sheet 40 is shown in continual contact with wall 30 throughout its length between the marginal edges 42 and 43. However, the sheet may be disposed such that only its edges 42 and 43 are in contact with wall 30, and extend linearly outwardly therefrom to an annular contact with surface 24. The sheet 40 is preferably fixed to the wall 30 with a suitable adhesive. Alternatively, however, the sheet 40 may be coated on its outer surface with a vulcanizable elastomeric compound and vulcanized to wall 30. The sheet 40 can be applied to the wall 30 after the tire is built or alternatively can be added during the building of a tire on a building drum.

From the foregoing, it can be seen that a sheet, sheets, strip or strips of capillary material may be disposed within the chamber in any desired manner provided that the material in some way, effectively bridges a distance between the tread portion 14 and a cooler portion of the tire, e.g. at least one of the bead portions 10 and 11.

The continuous extension of sheet 40 between bead portions, as well as its annular coextension with chamber wall 30 are features considered more practical from a tire fabrication standpoint. That is, the liner 40 as it is shown in FIG. 1, can be easily added to a conventional tire without a great departure from conventional tire building and fabrication steps. Also, the liner 40 as shown in FIG. 1 is thought to be best from durability and simplicity standpoints.

As stated, the sheet or lining 40 is a capillary material. By "capillary material" is meant a particular material which contains small, substantially continuous pores and is capable of "capillary action" when in contact with certain liquids. As an example, when holding the end of a towel in water, water rises or moves through the towel by "capillary action." The towel, thus, is said to have "capillary."

Figure 2:
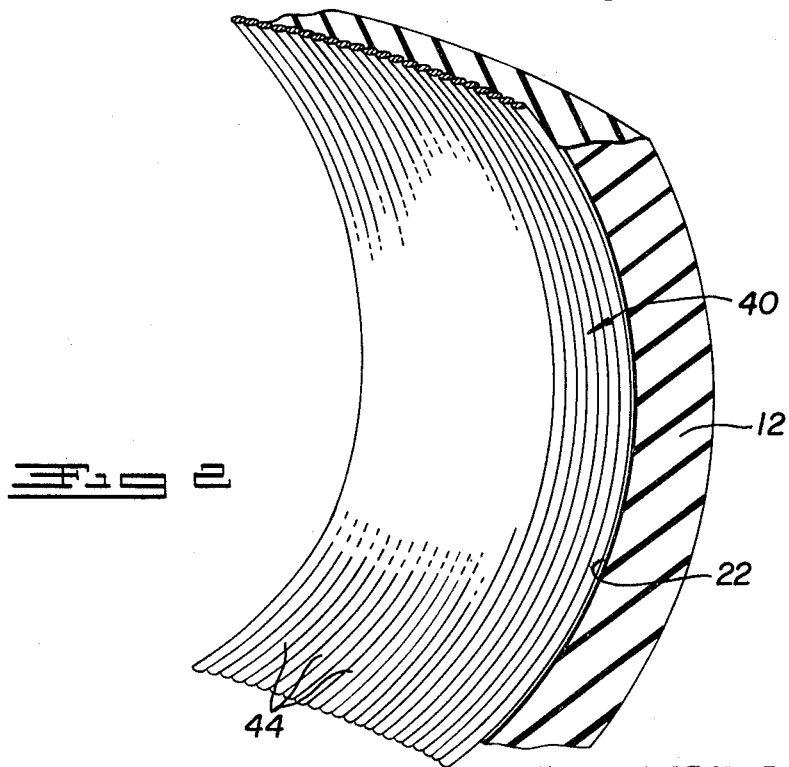
FIG. 2 is an enlarged fragmentary view of a tire which illustrates in more detail the fabric sheet provided along the tire's inner surface, certain portions omitted, shown in part and in section.

Various types of wicking material are good examples of capillary members. In fact, the sheet or liner 40, in a preferred form, comprises a wicking material, such as, for example, cotton. Referring to FIG. 2, the sheet 40 is shown specially composed of spaced, mutually parallel continuous cotton cords 44. Each cord 44 functions substantially as a separate "capillary tube." The cords are shown to be radially extending, that is, cords 44 extend across the chamber of the tire continuously and each lies in a plane which is substantially perpendicular to the plane of the circumferential centerline of the tire. In this way, the capillarity of the cords can be supplemented radially by centrifugal forces caused by rotation of the tire.

This radial disposition of cords is possible when the sheet 40 is applied after the tire is built. When applying this sheet 40 during building of the tire, the particular type of tire becomes significant. In a radial-type tire, the sheet is laid on the drum so the cords are radially disposed. However, in a bias-type tire of sheet 40 must be laid so that the cords are on a bias similar to the carcass. Therefore, when the capillary cords are employed in a bias-type tire and the layer of cords are applied during the building of the tire, the cords will be angularly disposed or on a "bias" across the inner wall 30.

The sheet or liner 40 may be composed of a capillary fabric other than cotton, if so desired. Also, wick-type tapes are useful as capillary members. A layer of foamed or "sponge" rubber having very small, continuous pores can also be used as a capillary material.

The selection of the capillary member or material to be used will depend upon the specific cooling liquid which is to be transported within the chamber. Some materials possess stronger capillarity for some liquids when compared with others. The sheet or lining 40 should then be made of a material selected on the basis of its capillary attraction for a certain cooling liquid.

In the preferred embodiment, an effective heat exchange liquid is water. However, other liquids may be used if desired. When selecting a cooling or heat exchange liquid to be used according to this invention, four general properties should be considered, latent heat of vaporization, surface tension, density and viscosity. A good liquid would be one having generally a high latent heat of vaporization, high surface tension, density and viscosity. However, other factors may ultimately influence the selection of a liquid, such as average ambient temperature in the locale where the tire is to be used, weight of the tire with and without the liquid, or cost. Selection of a heat exchange liquid can also depend upon the particular tire inflation gas used.

Having described the structural details of a preferred embodiment, further understanding may be gained by describing a heat exchange cycle as it occurs within tire casing 2. The inner chamber of the casing 2 is shown by the broken lines in FIG. 1, as including two general zones $Z_H$ and $Z_C$. The outer zone $Z_H$ represents the "hot" zone occuring when the tire is running. The inner zone $Z_C$ represents the "cool" zone in comparison with the remaining portions of the air chamber.

The lining 40 is moistened prior to running of the tire, and the capillary cords 44 each hold water by capillary attraction. When the temperature at zone $Z_H$ reaches a certain valve, water will vaporize from the portion of the cords 44 in that zone. When vaporization takes place, energy in the form of heat is taken from the immediate surroundings (e.g. the tread portion 14). Vaporization causes a pressure increase in zone $Z_H$. The pressure differential between zones $Z_H$ and $Z_C$ causes the vapor and absorbed heat energy to travel inwardly toward this rim and bead area, as indicated by arrow A. The capillary action of sheet 40 continuously transports nonvaporized liquid to zone $Z_H$ replace the liquid which has vaporized as indicated by the arrow B. This continual outward movement of liquid along wall 30 to zone $Z_H$ leaves a liquid "void" in a a portion of the liner adjacent each bead portion. Vapor upon reaching the cooler zone $Z_C$ will condense, releasing heat to the immediate surroundings (e.g. rim 3 and head portions 10 and 11). The condensate when contacting the "void" portions of sheet 40 will be reabsorbed thereby and recycled along wall 30 to the zone $Z_H$ by the capillary action of sheet 40. Thus, a substantially continuous heat exchange cycle is present while tire operation continues.

The preceding description deals mainly with the details of a preferred embodiment in order to demonstrate an inventive principle. It is evident that change can be made to meet particular applications without departing from the scope of the invention.

What we claim is:

1. The combination of a tubeless pneumatic tire having a pair of axially spaced, annular bead portions, a pair of axially spaced, annular sidewall portions extending substantially radially outwardly from said bead portions to join a circumferentially disposed annular tread portion, wherein the axial inner surfaces of said sidewall portions and the radially inner surface of said tread portion form a continuous, annular wall of a substantially toroidal chamber within said tire, and means within said toroidal chamber for cooling said tire, comprising a liquid transporting member of nonmetallic capillary material moistened with cooling liquid and extending from adjacent at least one of said pair of bead portions to said radially inner surface of said tread potion.

2. The combination as defined in claim 1 wherein said liquid transporting member commences adjacent one of said pair of bead portions, extends along said wall and terminates adjacent with other of said bead portions.

3. The combination as defined in claim 1 wherein said liquid transporting member is a sheet of wicking material.

4. The combination as defined in claim 2 wherein said liquid transporting member is a sheet of wicking material.

5. The combination defined in claim 4 wherein said sheet of wicking material covers the entire, annular wall of said chamber.

6. The combination as defined in claim 3 wherein said sheet of wicking material consists essentially of cotton.

7. The combination as defined in claim 4 wherein said sheet of wicking material consists essentially of cotton.

8. The combination as defined in claim 5 wherein said sheet of wicking material consists essentially of cotton.

9. The combination in claim 1 wherein said liquid transporting member comprises a plurality of capillary cords.

10. The combination as defined in claim 2 wherein said liquid transporting member comprises a plurality of capillary cords.

11. The combination as defined in claim 3 wherein said sheet comprises a plurality of spaced, substantially mutually parallel capillary cords.

12. The combination as defined in claim 4 wherein said sheet comprises a plurality of spaced, substantially mutually parallel capillary cords.

13. The combination as defined in claim 5 wherein said sheet comprises a plurality of spaced, substantially mutually parallel capillary cords.

14. The combination as defined in claim 6 wherein said sheet comprises a plurality of spaced substantially parallel cotton cords.

15. The combination as defined in claim 7 wherein said sheet comprises a plurality of spaced, substantially mutually parallel cotton cords.

16. The combination as defined in claim 8 wherein said sheet comprises a plurality of spaced, mutually parallel cotton cords.

17. The combination as defined in claim 12 wherein said cords are disposed in such that each cord lies in a plane substantially perpendicular to the plane containing the circumferential centerline of said casing.

18. The combination as defined in claim 13 wherein said cords are disposed such that each cord lies in a plane substantially perpendicular to a plane containing the circumferential centerline of said casing.

19. The combination as defined in claim 14 wherein said cords are disposed such that each cord lies in a plane substantially perpendicular to the plane containing the circumferential centerline of the casing.

20. The combination as defined in claim 15 wherein said cords are disposed such that each cord lies in a plane substantially perpendicular to the plane containing the circumferential centerline of the casing.

21. The combination as defined in claim 16 wherein said cords are disposed such that each cord lies in a plane substantially perpendicular to the plane containing the circumferential centerline of the casing.